Figure 7:
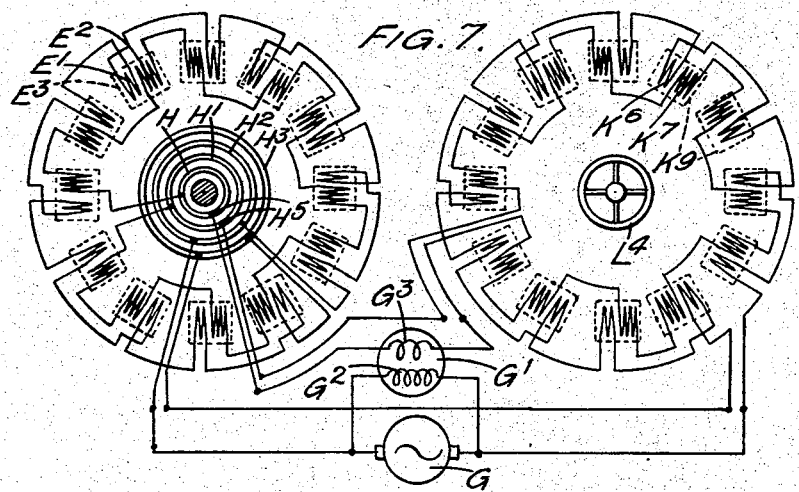

Sept. 16, 1941.  N. S. MUIR  2,256,406
TRANSMISSION DYNAMOMETER
Original Filed Feb. 15, 1937  3 Sheets-Sheet 1
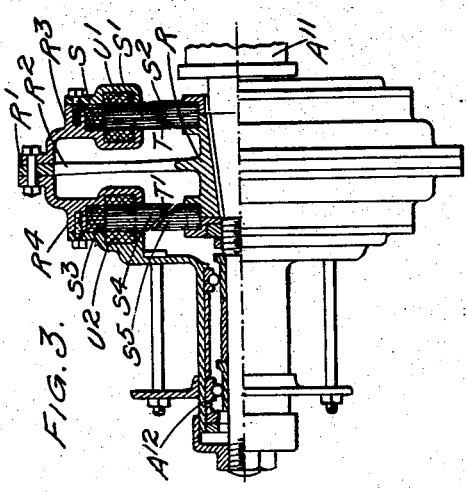
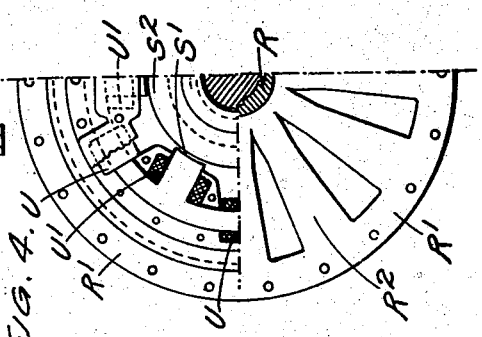
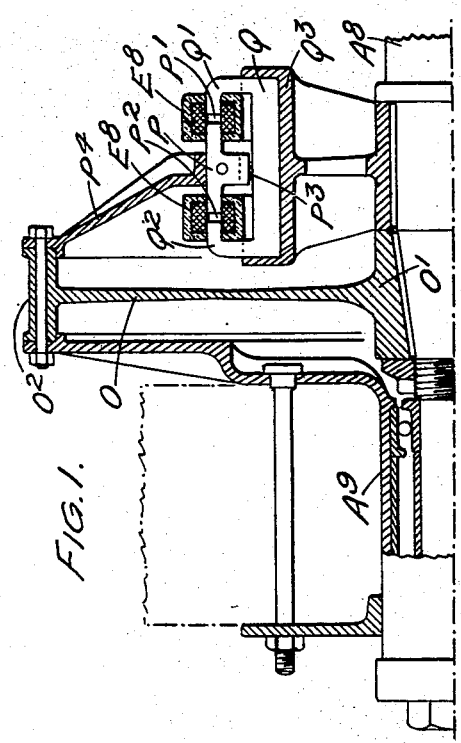
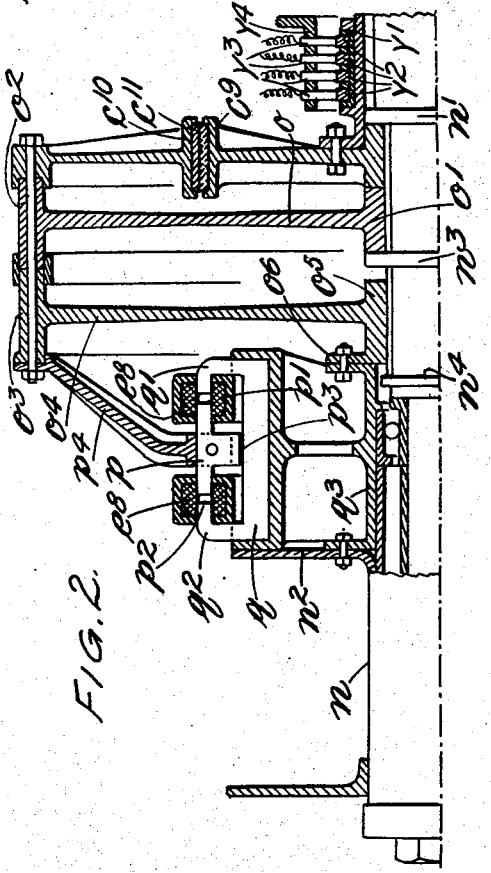
Inventor,
N. S. Muir

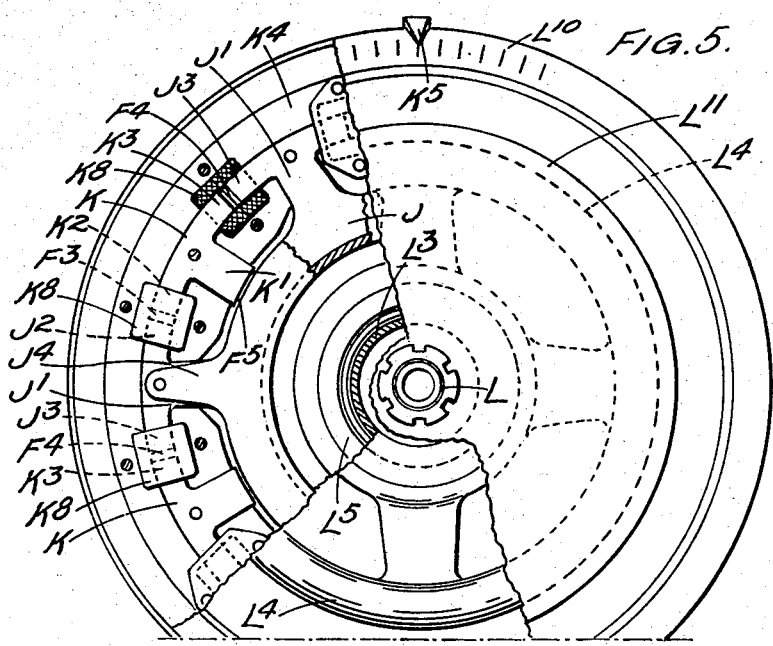
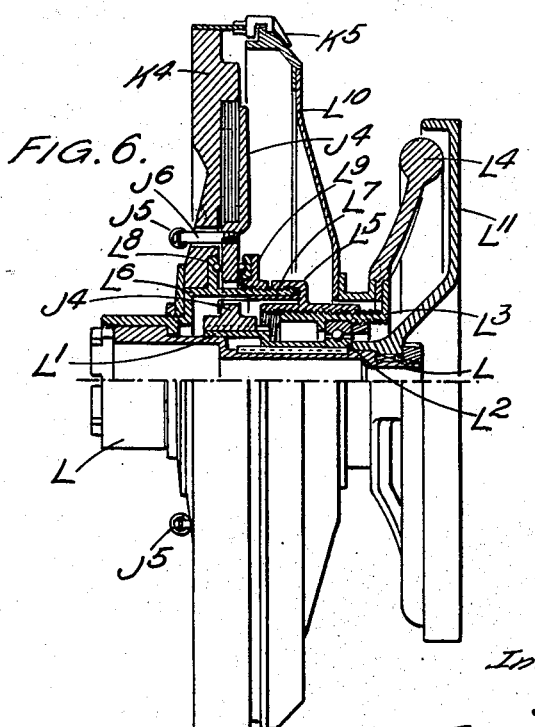

Sept. 16, 1941.  N. S. MUIR  2,256,406
TRANSMISSION DYNAMOMETER

Original Filed Feb. 15, 1937  3 Sheets-Sheet 3

Inventor,
N. S. Muir.

Patented Sept. 16, 1941

2,256,406

UNITED STATES PATENT OFFICE 2,256,406

TRANSMISSION DYNAMOMETER

Neil Shaw Muir, Farnborough, England

Original application February 15, 1937, Serial No. 125,914. Divided and this application August 9, 1938, Serial No. 223,987. In Great Britain February 21, 1936

8 Claims. (Cl. 265—1)

This invention relates to transmission dynamometers for measuring thrust in a power transmission system, and the present application is divisional from the present applicant's Letters Patent of the United States of America No. 2,173,039, which describes features similar to those of the present invention applied to a torsion dynamometer for power transmission mechanism.

One object of the invention is to provide a transmission dynamometer capable of measuring the true mean value of thrust transmitted irrespective of transient variations or oscillations of such thrust.

Another object of the invention is to provide a thrust dynamometer comprising two springs or the equivalent forming part of a power transmission system and connected in series with one another between the driving and driven members of the system, a device for damping oscillations of one of the springs, and means for measuring the deflection of the other spring.

It is to be understood that by the term "spring" is meant any member which is caused to deflect or otherwise vary its shape or size in accordance with the force exerted thereon due to the power transmitted by the system of which such member forms a part. Thus for example in a traction dynamometer or a thrust-meter the spring may consist of a disc, diaphragm or extensible member, the deflection, extension or contraction of which can be measured or damped as the case may be.

A further object of the invention is to provide electro-magnetic apparatus for measuring small relative movements between two elements which constitute part of a spring and are caused to move relatively to one another by the applied force. The relative movement which it is desired to measure is usually only one component of the various possible relative movements which can take place between the two elements, and for convenience will hereinafter be referred to as the selected component of movement.

This feature of the invention is concerned with electro-magnetic measuring apparatus of the kind in which the selected component of movement is caused to vary the reluctance of a magnetic circuit, as by varying the length of one or more air gaps therein, the resultant change in the magnetic flux being arranged to influence one or more suitably disposed coils connected to a measuring instrument or the equivalent.

It has been proposed, in such apparatus, to arrange a pair of similar normally balanced magnetic circuits partly on one element and partly on the other element so that the flux density or distribution of flux or both is varied in both circuits by relative movement of the elements, the disturbance of equilibrium of the magnetic circuits being measured by a suitable indicating instrument. It has also been suggested to provide in such an arrangement, a similar second pair of magnetic circuits, the equilibrium of which can be disturbed by hand or otherwise so that by connecting the two pairs in opposition to an indicating instrument, the instrument shows by a "null" indication when the equilibrium of the two pairs of magnetic circuits is disturbed by the same amount. The disturbance of the equilibrium of the second pair of circuits required to produce the "null" indication thus affords a direct measure of the disturbance of the equilibrium of the first pair by the movement to be measured.

Difficulties have been experienced with apparatus of the aforesaid kind owing to inaccuracies which are introduced when there are components of movement other than the selected component. These difficulties become particularly marked when the apparatus is applied to thrust-meters of the transmission type which operate at relatively high speeds—for example when employed in aircraft engines—and there are appreciable relative movements of the two elements in several directions due, for example, to shaft whip or vibration, axial misalignment or other causes.

An object of the present invention is to provide improved electromagnetic measuring apparatus of the above kind from which it is possible to obtain readings of the selected component which are substantially independent of or unaffected by other components of relative movement of the two elements concerned.

Yet another object of the invention is to provide a magnetic measuring apparatus in which three or more magnetic systems or circuits are mounted with part of each magnetic system on one of the relatively movable elements and part of each system on the other element so that the several systems are symmetrically disposed with respect to the selected component of movement and relative movement of the two elements varies the magnetic reluctance of the several systems, means being provided responsive to changes in the reluctance of the systems and so arranged that changes in reluctance of the several systems produced by the selected component of movement are additive whilst changes due to other components of movement balance out. Each of the several magnetic systems may be provided with multiple air gaps and coils responsive to variations of magnetic flux in the associated system, the coils of the several systems being so interconnected that voltages induced therein by variations of magnetic flux due to changes in the lengths of the air gaps, are additive when the changes are produced by the selected component of movement and substantially balance out when produced by other components of movement.

When the relative movement to be measured is a translational one, the several systems are symmetrically disposed about an axis parallel to the direction of movement and in each system there are, between the parts on the two elements, at least one air gap parallel to the axis and one air gap perpendicular to the axis (or an air gap having components parallel and perpendicular to the axis), the coils being so interconnected that changes in the lengths of the air gaps parallel to the axis are additive whilst changes in the voltages due to changes in the lengths of the other air gaps substantially balance out.

In the above definition of the invention and throughout the specification air gaps are specified in terms of the direction of the length of the gap measured along the lines of magnetic flux which pass across it. Thus, for example, an "axial" air gap is one in which the length, as defined above, lies along a line parallel to the axis, whilst a "radial" air gap is one in which the length of the air gap lies along a radius of a circle.

Preferably each magnetic system comprises a pair of similar normally balanced magnetic circuits arranged so that the selected component of movement causes a change in the length of an air gap in each circuit, the changes in the air gaps in the two circuits being in opposite senses.

In one convenient construction each system comprises a substantially U-shaped main body or core of magnetic material connected to one element and an armature disposed between the limbs of the core and connected to the other elements. Preferably the core is so magnetised as to form two magnetic circuits one of which includes the air gap between the armature and one of the limbs of the core and the other the air gap between the armature and the other limb of the core, an air gap formed between the armature and the yoke connecting the limbs of the core being common to both magnetic circuits. Preferably each magnetic system is provided with two coils respectively responsive to changes of magnetic flux in the two circuits of the system, the two coils being connected in opposition and the opposed pairs of coils of the several systems being connected in series.

The following is a description, by way of example, of several convenient constructions of transmission dynamometer and electromagnetic measuring apparatus according to this invention with reference to the accompanying drawings, in which Figure 1 is a sectional side elevation of a dynamometer for thrust measurements in an aircraft engine transmission system, Figure 2 is a sectional side elevation of the dynamometer shown in Figure 1 provided with a damped spring, Figures 3 and 4 are respectively side and end elevations (partly in section) of another construction of dynamometer for thrust measurements in an aircraft engine transmission system, Figure 5 is a front elevation, partly broken away, of part of the measuring apparatus, Figure 6 is a side elevation, partly in section, of the apparatus shown in Figure 5, Figure 7 is a wiring diagram showing the electrical connections of the apparatus shown in Figures 1 to 6, and Figure 8 is an elevation, partly in section, of a modified form of the measuring apparatus shown in Figures 5 and 6.

A construction of dynamometer which is suitable for measuring translational movements such as the thrust of a rotating shaft, as in a thrustmeter, or direct tension or compression, as in a traction dynamometer, is shown in Figure 1 as employed for measuring the thrust developed by an airscrew. In the arrangement shown in this figure, the drive from the engine shaft $A^8$ is transmitted through a disc O which may be solid or may consist of spokes which are flexible in directions parallel to the axis, having its hub $O^1$ connected to the shaft $A^8$ and its rim $O^2$ to a flange on the airscrew boss $A^9$, this boss being mounted on ball or roller bearings on an extension of the shaft $A^8$. The disc O should be sufficiently flexible for the rim $O^2$ to move relatively to the hub $O^1$ in a direction parallel to the axis (of the shaft $A^8$) by an amount depending upon the axial thrust. The electromagnetic apparatus thus has to measure relative axial movements between the rim $O^2$ and the hub $O^1$.

This apparatus comprises a number of individual magnetic systems which are disposed in planes containing the axis of the shaft. Each system comprises a T-shaped armature P disposed between the limbs $Q^1$ and $Q^2$ of a U-shaped core Q so that there are three air gaps $P^1$, $P^2$, $P^3$ in each system. The several magnetic systems are symmetrically arranged about the axis of the disc O so that in each system the two air gaps $P^1$ and $P^2$ respectively lie in two planes parallel to one another and perpendicular to the axis, their lengths being parallel to the axis, whilst that of the air gap $P^3$ is perpendicular to the axis, i. e. substantially radial. The armatures P of the several systems are mounted on an annular ring $P^4$ which is rigidly connected to the rim $O^2$ of the disc O, whilst the cores Q are mounted on a hub or spider $Q^3$ keyed to the shaft $A^8$ so as to be, in effect, rigidly connected to the hub $O^1$ of the disc O. Stops (not shown) may be provided to limit the relative axial movement of the boss and the hub.

When, due to airscrew thrust, the disc O flexes and the rim $O^2$ moves relatively to the hub $O^1$, the lengths of the air gaps $P^1$ and $P^2$ change, the gap $P^1$ of each system increasing in length and the gap $P^2$ decreasing, the lengths of the radial air gaps $P^3$ remaining unaltered. If, however, there is relative movement of the rim $O^2$ and the hub $O^1$ in planes perpendicular to the axis, the lengths of the radial gaps $P^3$ vary. Coil units $E^8$, each containing a primary coil $E^1$ and a secondary coil $E^2$, are mounted around the air gaps $P^1$ and $P^2$ of each system, and the coils of the several systems are so connected that the secondary output voltage depends on the mean variation of the lengths of the air gaps $P^1$ and $P^2$ and is substantially independent of variations in the lengths of the radial air gaps $P^3$.

The several systems are magnetised by passing an intermittent or alternating current from an appropriate generator, indicated at G in Figure 7, through coils $E^1$ (Figure 7), these coils being so arranged that each armature P forms part of one magnetic system and each system has two magnetic circuits. There are thus a number of magnetic systems corresponding to the number of armatures Q symmetrically disposed around the shaft $A^8$.

In each magnetic system the flux in one magnetic circuit passes from a pole $Q^1$ across the adjacent axial air gap $P^1$ to the corresponding pole of the adjacent armature P, across the radial air gap $P^3$ and back through the armature Q to the pole $Q^1$. The other magnetic circuit of the system is similar to that described above but includes the axial air gap $P^2$ at the other end of the armature P.

It is to be noted that the radial air gap $P^3$ and the radial member of each armature P form part of both the magnetic circuits of the associated system. Accordingly the several magnetising coils $E^1$ are connected to the generator G in series with one another in the appropriate sense for the magnetic fluxes of two magnetic circuits which in part have a common path to be in the same direction in such common path. The initial lengths of the air gaps $P^1$, $P^2$ and $P^3$ and the excitation are so chosen that the flux densities in the armatures P and Q (even when there is maximum axial movement and one air gap $P^1$ or $P^2$ is very short) do not approach the saturation value. Thus, the variations in the mean flux in the two magnetic circuits of a system are approximately directly proportional to the variations in the lengths of the axial air gaps of the system.

Each of the magnetic circuits is provided with a coil $E^2$ (Figure 7) which is so mounted that it is responsive to changes in the magnetic flux in the circuit, this coil being hereinafter referred to as the secondary coil to distinguish it from the magnetising or primary coil of the circuit. The primary and secondary coils $E^1$ and $E^2$ of each magnetic circuit are preferably, as shown in Figure 1, mounted together so as to form a single tubular coil unit $E^3$ surrounding the air gap $P^1$ or $P^2$ of the associated magnetic circuit. The primary and secondary coils $E^1$ and $E^2$ may be wound side by side as indicated diagrammatically in Figure 7, either on a single former or on separate formers. Preferably, however, alternate layers of primary and secondary turns are wound on a single former or each coil is made of a series of flat coil units, the units of the primary and secondary windings being arranged alternately, or any other convenient winding arrangement is adopted so as to obtain a high degree of inductive coupling between the primary and secondary windings. If desired any convenient form of metallic screening may be employed between the primary and secondary windings so as to reduce the capacity coupling between them.

The two secondary coils $E^2$ of each magnetic system are connected in opposition so that when the two air gaps $P^1$, $P^2$ of the systems are equal, there is no secondary output. When there is relative axial movement between the hub $O^1$ and the rim $O^2$, the increase in length of one air gap, say the gap $P^1$, and the corresponding decrease in the other air gap ($P^2$) of each system, disturbs the balance of the secondary voltages induced in the coils $E^2$ (due to the current flowing in the primary windings $E^1$) and the out-of-balance voltage produced is a measure of the mean axial movement and, in the appropriate cases, of the thrust transmitted through the spring. The opposed pairs of coils $E^2$ of the several systems are, as shown in Figure 7, connected in series so that the out-of-balance voltages are additive and thus produce a total output voltage which is a measure of the mean variation in length of the axial air gaps $P^1$, $P^2$ of all the systems.

When there are radial oscillations in the transmission system or there is slight axial misalignment between the engine shaft $A^8$ and the air-screw boss $A^9$, the radial air gaps $P^3$ will vary correspondingly and thus produce alterations in the out-of-balance voltages derived from the individual pairs of coils $E^2$. Since, however, the magnetic systems are symmetrically disposed about the axis of the shaft $A^8$, any radial displacement which causes an increase in the secondary output voltage from the coils of the system or systems on one side of the axis will cause a corresponding decrease in the output voltages derived from the coils of the system or systems on the diametrically opposite side of the axis. Thus, by reason of the series connection of the coils $E^2$, the variations due to radial displacement will balance one another so that the resultant output voltage is independent thereof. Thus, the apparatus is rendered substantially independent of relative movements of the hub $O^1$ and the rim $O^2$ other than relative axial movements.

Frequently, however, it is desirable to reduce as far as possible current flow in the secondary coils and associated circuits. This is particularly so in apparatus having rotating magnetic systems to which connections have to be made through slip rings. Even when, as is usual in such an arrangement, variations due to brush vibration are reduced by providing each slip ring with three or more brushes spaced around its periphery, the current flowing causes voltage drops which vary with the output voltage and consequently with axial movement. Thus the readings must be corrected and the corrections necessary are difficult to make, particularly when measurements are made at varying speeds.

Accordingly measurement of the relative movement is preferably effected by a "null deflection" method of the known general type which is referred to above. To this end the output circuit from the secondary coils of the several magnetic systems of the apparatus shown in Figure 1, which, for convenience of description will be referred to as the "transmitter", is connected to the output circuit of a "receiver" which is shown in Figures 5 and 6 and comprises a set of magnetic systems similar in characteristics to the magnetic systems of the transmitter. The receiver is provided with a main core J having radial arms $J^1$ with poles $J^2$ and $J^3$ corresponding to those of the cores Q of the transmitter. The receiver is provided with T-shaped armatures K similar in dimensions and shape to the armatures P so that there are circumferential air gaps $F^3$ and $F^4$ respectively between the pole $J^2$ and one end $K^2$ of an armature and between the pole $J^3$ and the other end $K^3$ of the same armature and a radial air gap $F^5$ between the upright member $K^1$ of the armature and the part of the core J between adjacent arms $J^1$.

The magnetic systems of the receiver are arranged so that their air gaps $F^3$ and $F^4$ can be varied by rotating a hand wheel or other manually operable control device. Thus, as clearly shown in Figure 6, the receiver has a main tubular supporting shaft L on which is mounted a sleeve $L^1$ capable of sliding along the shaft but prevented from rotating thereon by a key. The sleeve $L^1$ has at one end (the front end) a flange $L^2$ connected through a ball bearing to an externally screw-threaded cylindrical member $L^3$ connected at its front end to a hand wheel $L^4$. The screwthread on the member $L^3$ engages with an internal screwthread in a sleeve $L^5$ which is fixed on arms $L^7$ extending axially from the end of a tubular member $L^6$ fixed to the rear end of the supporting shaft L. When the hand wheel $L^4$ is rotated, the sleeve $L^3$ is rotated relatively to the fixed member $L^5$ and the engaging screwthreads cause longitudinal movement of the member $L^3$ and a corresponding movement of the sleeve $L^1$ connected thereto, the whole arrangement constituting a reduction drive whereby a large rotational movement of the handwheel $L^4$ produces a relatively small longitudinal movement of the sleeve $L^1$.

Mounted on the rear end of the sleeve $L^1$ is a supporting spider $J^4$ for the magnetic core J. The spider $J^4$ is provided with slots through which the arms $L^7$ pass, the arrangement being such as to permit the requisite rocking movement of the spider $J^4$ about the axis of the shaft L for varying the air gaps $F^3$ and $F^4$. Axial movement of the spider $J^4$ on the shaft L is prevented by thrust bearings arranged between the spider $J^4$ and radial flanges $L^8$ and $L^9$ on each side thereof, the flange $L^8$ being formed integral with the member $L^6$ and the flange $L^9$ screwed on to the ends of the arms $L^7$. The hub of the spider $J^4$ engages the sleeve $L^1$ in such a manner (e. g. as by inclined cam surfaces or a quick-pitch screwthread arrangement), that longitudinal movement of the sleeve along the shaft L causes rotational or rocking movement of the spider $J^4$. Owing to the reduction drive referred to above a relatively large movement of the hand wheel $L^4$ produces only a small rocking movement of the spider $J^4$ and the core J carried thereby. The armatures K are carried by a plate $K^4$ fixed on the member $L^6$ and having a pointer $K^5$ which cooperates with a disc-like scale $L^{10}$ arranged to move with the hand wheel $L^4$. In order to ensure positive movement of the spider $J^4$ as the sleeve $L^1$ moves longitudinally, the cooperating parts (e. g. cams and slots or screwthreads of the quick-pitch type) on the hub of the spider $J^4$ and on the sleeve $L^1$ are maintained in engagement by springs $J^5$ connected between the plate $K^4$ and pins $J^6$ carried on the spider $J^4$ and passing through slots in the plate $K^4$, the pins $J^6$ also acting as stops to limit the permissible movement of the core J. The hand wheel $L^4$ is protected by a disc-like shield $L^{11}$ keyed to the shaft L.

The receiver is provided with primary and secondary coils $K^6$ and $K^7$ (Figure 7) which are preferably, as in the transmitter, arranged as single tubular coil units $K^8$, there being one of such units mounted around each of the air gaps $F^3$ and $F^4$. As shown in Figure 7, the primary coils $K^6$ of the receiver are energised from the source G in series with the primary coils $E^1$ of the transmitter. The secondary coils $K^7$ of the receiver are connected so that the two coils of a system are in opposition and the several pairs are connected in series. The output circuits from the transmitter and the receiver are connected in opposition in series with a sensitive electrical measuring instrument $G^1$ (Figure 7) the impedance of which should be matched with that of the associated circuit so as to obtain maximum sensitivity. The measuring instrument $G^1$ is preferably, as shown, of the dynamometer type having one coil $G^2$ energised by alternating current supplied from the source G either in parallel with the primary coils as shown or, if desired, in series therewith. The other coil $G^3$ is connected in series with the output circuits from the transmitter and receiver.

When there is no movement to be measured and the receiver is in its mid position, there is no output from either the receiver or the transmitter and the pointer of the instrument $G^1$ (which preferably has a central zero position so as to give a directional indication) remains in the zero position. When the thrust is transmitted through the spring, there is relative movement between the hub $O^1$ and rim $O^2$ and the resultant output voltage of the transmitter secondary coils causes a deflection of the pointer of the instrument G. The hand wheel $L^4$ of the receiver is then operated to alter the air gaps $F^3$ and $F^4$ of the receiver in the appropriate direction until electrical balance is restored and there is no deflection.

The movement of the receiver air gaps $F^3$ and $F^4$ to restore balance is an indication of the mean movement of the transmitter air gaps F and $F^1$ due to the mean relative movement between the hub $O^1$ and rim $O^2$, and thus the movement of the hand wheel $L^4$ which is required provides an indication of the mean movement to be measured. The movement of the hand wheel is indicated by the reading on the disc $L^{10}$ opposite the pointer $K^5$, any suitable vernier or other device (not shown) being fitted, if required.

The source of alternating current G used for energising the primary coils $E^1$ and $K^6$ should have a frequency appreciably above the frequency of any mechanical oscillations likely to occur in the power transmission system on which measurements are being made, this A. C. frequency preferably being at least ten times the highest frequency of any appreciable vibrational movement likely to occur. The exciting current may be supplied from any suitable source having its frequency stabilised and capable of supplying a constant voltage. This source may, for example, comprise a permanent magnet alternator or a valve oscillator and should preferably have a sinusoidal voltage output. When an intermittent D. C. is used, instead of A. C., it may be supplied from a battery or other suitable source through a rotary commutator driven at the speed necessary to produce the desired impulse frequency.

The coil windings and the initial settings of the air gaps are preferably chosen to suit the operating characteristics and other properties of the transmission system and/or shaft or spring with which the apparatus is being used. It has been found that the accuracy of the readings is increased if a step-up ratio is used between the primary and secondary coils ($E^1:E^2$ and $K^6:K^7$) as this increases the secondary voltage output for a given change in air gap length. Furthermore it is desirable so to choose the transformation ratios of the two pairs of coils on each magnetic system as to compensate for non-linear characteristics in the two magnetic circuits of the system in such a way that the resultant output voltage from the two opposed coils of a system has a substantially linear characteristic, i. e. is directly proportional to the changes in lengths of the air gaps ($P^1$ and $P^2$), provided that the apparatus is arranged so that the movements to be measured always take place in one direction from the mid position in which the air gaps are equal. The winding ratios can, when necessary, be selected so as to compensate for non-linearity of the thrust-deflection characteristic of the part of the transmission system across which the apparatus is connected. From the foregoing it will readily be appreciated that the characteristics of the improved measuring apparatus according to this invention can be matched to suit any desired type of spring, and that when so matched the apparatus gives an accurate measure of the mean value of a fluctuating thrust.

Figure 8:
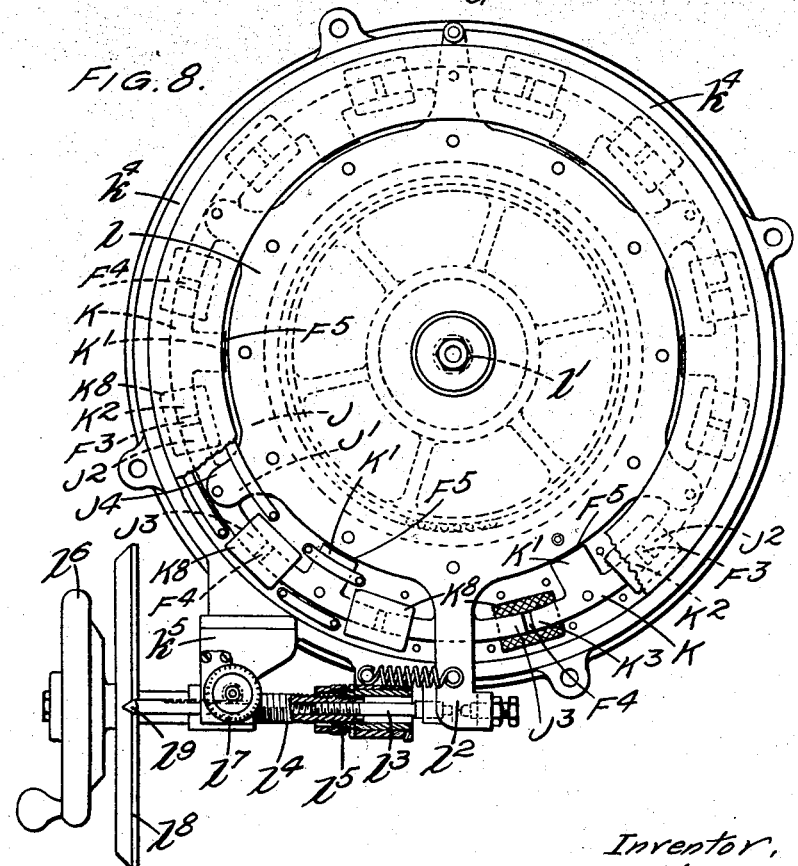

Figure 8 shows an alternative form of receiver, which is preferably employed, in which the magnetic systems are similar to those of the arrangement shown in Figures 5 and 6 but which differs from that shown in these figures in the means for effecting relative movement between the core and the armatures.

Thus, as shown in Figure 8, in which parts corresponding to parts of the apparatus shown in Figures 5 and 6 are given the same reference letters, the core J is supported on a plate $l$ rotatably mounted on ball bearings on a fixed shaft $l^1$ whilst the armatures K are carried on a fixed plate $k^4$ keyed to the shaft $l^1$. A ball thrust bearing (not shown) is provided between the plates $l$ and $k^4$, the arrangement being such as to prevent all relative movement of the two plates other than angular or rocking movement.

Rocking movement of the plate $l$ relative to the plate $k^4$ to effect the desired alteration in the lengths of the air gaps $F^3$ and $F^4$ is effected by means of a radial arm $l^2$ extending from the plate $l$ and moved relatively to a fixed member $k^5$ on the plate $k^4$ by "slow motion" screw mechanism. This mechanism comprises a screwthreaded rod $l^3$ having one end fixed to the arm $l^2$ and the other end engaging in an internally screwthreaded sleeve $l^4$. This sleeve is also externally screwthreaded to engage in an internally screwthreaded collar $l^5$ rigidly connected to the plate $k^4$. The pitches of the screwthreads on the inside and outside of the sleeve $l^4$ differ from one another and, moreover, are of the same "hand". Thus at each rotation of the sleeve $l^4$, the arm $l^2$ is moved towards or away from the member $k^5$ by an amount depending on the difference in the pitches of the two screwthreads, movement of the arm $l^2$ effecting a corresponding rocking movement of the plate $l$ and the core carried thereby. A hand wheel $l^6$ is provided for rotating the sleeve $l^4$ and the amount of movement of the arm $l^2$ is recorded by a counting device $l^7$ which indicates the number of revolutions of the sleeve $l^4$ in conjunction with a disc $l^8$ which is attached to the hand wheel $l^6$ and cooperates with a pointer $l^9$ fixed to the member $k^5$ to indicate fractions of a revolution of the hand wheel $l^6$ and sleeve $l^4$. In other respects this receiver is similar to that shown in Figures 5 and 6 and thus it need not be described in further detail.

It will be appreciated that this operating mechanism provides a very accurate means of obtaining and measuring very small movements of the core J relative to the armatures K and that it avoids all backlash or variable factors which sometimes arise in the arrangement shown in Figures 5 and 6 even when this apparatus is, as described, provided with the springs $J^5$.

If desired the construction illustrated in Figure 1 may be provided with a damped spring to absorb axial oscillations, such a construction being shown in Figure 2. As shown in this figure, in which parts corresponding to parts of the construction of Figure 1 are given the same reference letters but small instead of capital letters, an airscrew boss $n$ is supported on bearings on an extension of the engine shaft $n^1$ in such a manner that it is capable of moving axially on this shaft, and two springs, which are flexible in an axial direction, are arranged on the shaft $n^1$ between the engine (not shown) and the boss $n$. The first spring comprises a disc $o$ which may consist of spokes which are flexible in directions parallel to the axis having a hub $o^1$, keyed to the shaft $n^1$, and a rim $o^2$. The rim $o^2$ is bolted directly to the rim $o^3$ of another similar flexible disc $o^4$ having a hub $o^5$ provided with a flange $o^6$ connected, through a hub $q^3$ forming part of the measuring apparatus to be described below, to a flange $n^2$ on the airscrew boss $n$. The hub $o^5$ may be keyed to the shaft $n^1$ so that the drive is transmitted directly to the airscrew boss, or this hub may be free to rotate on the shaft so that the drive is actually transmitted through the discs $o$ and $o^4$. In either case, however, the hub $o^5$ is free to move longitudinally on the shaft and its normal position is such that, as shown in Figure 2, it does not engage either of the rings $n^3$ and $n^4$ provided on the shaft on each side of the hub $o^5$ to limit its axial movement. During operation the airscrew thrust tends to cause movement of the hub $o^5$ relative to the fixed hub $o^1$, the thrust being transmitted through the discs $o^4$, the rims $o^3$ and $o^2$ and the disc $o$ to the fixed hub $o^1$. The discs $o^4$ and $o$ thus deflect axially by an amount depending upon the airscrew thrust, this deflection taking place irrespective of whether or not the hub $o^5$ is actually keyed (by a feather key or the equivalent) to the engine shaft $n^1$. The axial vibrations or oscillations of the disc $o$ are damped by a device consisting of two annular rings $c^9$ and $c^{10}$ respectively connected to the engine shaft $n^1$ and the rim $o^2$. The rings $c^9$ and $c^{10}$ have their cooperating surfaces in the form of cylinders concentric with the axis and separated by a friction lining $c^{11}$. The shaft $n^1$ supports a ring $Y^1$ carrying slip rings $Y^2$ provided with brushes $Y^3$ held by a ring $Y^4$ which may be bolted to the engine casing.

The apparatus for measuring the deflection of the disc $o^4$ may be of any convenient type but is preferably similar to that employed in the construction shown in Figure 1 which is described above.

When, due to airscrew thrust, the discs $o$ and $o^4$ flex, there is relative movement between the hub $o^5$ and the rim $o^3$ and also between the rim $o^2$ and the hub $o^1$. Deflections of the disc $o$ due to, for example, transient oscillations are adequately damped by the friction between the portions of the lining $c^{11}$ carried by the rings $c^9$ and $c^{10}$, whilst deflection of the disc $o^4$ causes the lengths of the air gaps $p^1$ and $p^2$ to alter, the gap $p^1$ of each system increasing in length and the gap $p^2$ decreasing. The lengths of the radial air gaps $p^3$ remain unaltered. If there is relative movement of the rim $o^3$ and the hub $o^5$ in planes perpendicular to the axis of the shaft $n^1$, the lengths of the radial air gaps $p^3$ vary. The output voltage may, as in the construction shown in Figure 1, be measured directly or a "null deflection" method may be used in which the output voltage from the several magnetic systems (the "transmitter") is balanced against that from an exactly similar arrangement of magnetic systems (the "receiver") which are adjusted by a hand controller, the movement of the hand controller required to obtain balance being measured.

Another construction, also suitable for thrust or traction measurements or for measuring other translational movements, is shown in Figures 3 and 4 as employed for measuring airscrew thrust. In this arrangement the drive is transmitted from the engine shaft $A^{11}$ to an airscrew boss $A^{12}$ mounted in ball bearings on an extension of the shaft through a radial spoke spring having a hub R connected to a rim $R^1$ by spokes $R^2$ which (as most clearly shown in Figure 4) are relatively stiff in directions perpendicular to the axis and flexible in directions parallel to the axis. This drive is thus similar to that shown in Figure 1 in which the rim $R^1$ moves relatively to the hub R in an axial direction due to airscrew thrust, the spokes $R^2$ being sufficiently stiff to prevent relative angular movement between the hub R and the rim $R^1$ due to the torque transmitted.

The measuring apparatus consists of two symmetrical magnetic arrangements disposed one on each side of the spring, each arrangement being connected between the hub R and the rim $R^1$. The arrangement on the same side of the spokes $R^2$ as the engine comprises an annular core S with salient poles $S^1$ surrounding a central ring-like armature $S^2$. The arrangement on the other side of the spokes $R^2$ has a similar core $S^3$ with radial spokes $S^4$ and a central armature $S^5$. The armatures $S^2$ and $S^5$ are supported between flanges on axial extensions of the hub R so that they are coaxial with the shaft $A^{11}$ and are parallel to one another. The two cores S and $S^3$ are rigidly supported on flanges $R^3$ and $R^4$ attached to or formed integral with the rim $R^1$ on each side thereof, there being air gaps T between the poles $S^1$ and the armature $S^2$ and air gaps $T^1$ between the poles $S^4$ and the armatures $S^5$. Thus, the selected component of movement, i. e. axial movement, between the rim $R^1$ and the hub R, causes relative axial movement between the armatures $S^2$, $S^5$ and the encircling cores S and $S^3$.

The faces of the poles $S^1$ and $S^4$ of the cores and the cooperating surfaces of the armatures $S^2$ and $S^5$ are chamfered so that the air gaps T and $T^1$ between the poles and the armatures are inclined to the axis at an angle, say 45°, such that when the armatures move axially, the lengths of all the air gaps T or $T^1$ between each armature and its cooperating poles increase or decrease by the same amount, whilst when the armatures move in planes at right angles to the axis, the lengths of the air gaps on one side of the shaft $A^{11}$ increase and those on the other side decrease. The lengths of the air gaps T and $T^1$ of the two systems are inclined to the axis at angles which are equal but in the opposite sense. Thus, when there is relative axial movement between the cores and the armatures due to axial deflection of the spokes $R^2$ produced by airscrew thrust, the air gaps, for example the air gaps $T^1$ between the poles $S^4$ and the armature $S^5$, decrease, whilst the air gaps T between the poles $S^1$ and the armature $S^2$ increase.

The cores S and $S^3$ are provided with primary windings U wound around the parts thereof between adjacent poles, the primary windings U being so connected in series that when the coils are energised from a suitable A. C. source, each core S or $S^3$, with its associated armature $S^2$ or $S^5$, is excited in such a manner that there are a number of magnetic circuits corresponding to the number of poles $S^1$ or $S^4$ formed in the core, each magnetic circuit extending from one air gap T or $T^1$ (Figure 3) through the associated pole and the core to an adjacent pole, across the air gap of this pole to the armature and back through the armature to the first air gap.

The poles $S^1$ of the core S are provided with secondary windings $U^1$ and the poles $S^4$ of the core $S^3$ with secondary windings $U^2$. The secondary coil $U^1$ on each pole $S^1$ is connected in opposition with the winding $U^2$ on the corresponding pole $S^4$ of the core $S^3$, the pairs of oppositely connected secondary windings $U^1$, $U^2$ being connected in series to provide the output voltage. If desired, instead of connecting the corresponding secondary coils $U^1$, $U^2$ directly in opposition, all the secondary coils $U^1$ on the poles $S^1$ can be connected in series with one another and in opposition to the series-connected secondary coils $U^2$ on the poles $S^4$. Slip rings and cooperating brushes (not shown) are provided for making connection to the primary coils U and the secondary output circuit from the coils $U^1$ and $U^2$. It will be apparent from the arrangement of the connections that the magnetic circuits of corresponding poles of the two cores S and $S^3$ of this construction correspond to the two magnetic circuits of each magnetic system of the other constructions described above. Thus when the armatures $S^2$ and $S^5$ are midway between the cores S and $S^3$ so that the lengths of the air gaps T and $T^1$, measured in a direction parallel to the axis, are equal, the outputs from the opposed secondary coils $U^1$, $U^2$ will substantially balance, whilst when there is relative axial movement between the armatures and the cores, an out-of-balance voltage will be produced proportional to such movement.

Should there be relative movement between the rim $R^1$ and the hub R in planes at right angles to the axis of the shaft $A^{11}$, i. e. components of movement other than the selected component, the lengths of the air gaps T and $T^1$, as measured in a direction perpendicular to the axis, will increase on one side of the axis, and decrease on the other side. Since however the two cores S and $S^3$ are symmetrical with respect to one another and the axis, variations in the lengths of the air gaps of corresponding poles of the two arrangements will be the same and will thus balance one another in the opposed secondary windings $U^1$ and $U^2$. Accordingly the effects of relative movements other than the selected component are balanced out.

The measurements can be made either directly or by a "null deflection" method as in the other constructions described, and since the circuit arrangements are generally similar to those described above, it is believed to be unnecesary to describe them in further detail.

It will be noted that the improved electromagnetic measuring apparatus according to this invention not only has the advantage that it enables a measurement to be obtained which is substantially independent of external or other vibrations of the system or apparatus to which it is applied, but also it is compact and can readily be fitted to existing apparatus at, for example, shaft couplings. Furthermore, owing to its symmetrical form its application does not disturb the balance of a rotating system nor has it itself any "speed" error due to centrifugal force, which, in many forms of dynamometer apparatus hitherto known, has to be corrected for in so far as this is possible. Yet another advantage of the apparatus is that it is relatively simple to use and does not require expensive and delicate measuring instruments, this advantage being of particular importance when the apparatus is used in aircraft for obtaining values of thrust when flying.

It will be apparent that in the construction of dynamometer having two springs in series the clamped spring serves to absorb or smooth out transient variations, for example, cyclic or other variations in the force transmitted due to the characteristics of the engine or other source of driving power or to the nature of the load on the transmission system. The consequent reduction in the amplitude of such variations not only facilitates the measurement of the true mean value of the deflection of the free spring but also simplifies the construction and design of this spring. Another important advantage of this improved dynamometer, particularly when used in rotary machinery, is that it is symmetrical about the axis of rotation and is independent of speed variations.

It is to be understood that the springs used will be so chosen with respect to the force to be transmitted and the general operating conditions that the flexibility of each spring always conforms to predetermined calibrated values and that after deflection the spring across which measurements are made returns to its original position when the load is removed, without backlash.

What I claim as my invention and desire to secure by Letters Patent is:

1. In a thrust dynamometer for power transmission mechanism, the combination with two transmission elements of the transmission mechanism, of two resilient members connected between the transmission elements so that the thrust to be measured is transmitted through them in series, damping means connected across one resilient member, and measuring means connected across the other resilient member to measure the deflection thereof.

2. In a thrust dynamometer for power transmission mechanism, the combination with two transmission elements of the transmission mechanism, of two resilient members connected between the transmission elements so that the thrust to be measured is transmitted through them in series, damping means connected across one resilient member, and measuring means connected across the other resilient member and including at least three magnetic circuits symmetrically arranged about an axis parallel to the line of the thrust to be measured and each having parts adapted to be relatively moved to vary the reluctance of the respective circuit in accordance with the deflection of the resilient member due to the transmitted thrust to be measured.

3. In a thrust dynamometer for power transmission mechanism, the combination with two rotating transmission elements, namely a driving member and a driven member, of two resilient members connected between the transmission elements so that the thrust to be measured is transmitted through them in series, damping means connected across the resilient member nearer to the driving member, and measuring means connected across the resilient member nearer to the driven member for measuring the deflection thereof.

4. In a thrust dynamometer for power transmission mechanism, the combination with two transmission elements of the transmission mechanism of resilient connecting means connected between them so that the thrust to be measured is transmitted through said means and an electromagnetic measuring device connected to said elements to measure the relative axial movement between them and including a plurality of magnetic circuits symmetrically arranged about an axis parallel to the line of the thrust to be measured and each including a U-shaped magnetic core and an armature arranged between the limbs thereof so as to leave an air gap between the armature and each limb of the core, the core and armature being so carried respectively by the two transmission elements that relative axial movement will increase the length of one of the said air gaps and decrease that of the other.

5. In a thrust dynamometer for power transmission mechanism, the combination with two transmission elements of the transmission mechanism of resilient connecting means connected between them so that the thrust to be measured is transmitted through said means and an electromagnetic measuring device connected to said elements to measure the relative axial movement between them and including a plurality of magnetic circuits symmetrically arranged about an axis parallel to the line of the thrust to be measured and each including a U-shaped magnetic core and a T-shaped armature situated within the U-shaped core so that the head portion forms a pair of axial air gaps with the limbs of the core whilst the stem portion forms a radial air gap with the base of the core, the core and armature being so carried respectively by the two transmission elements that relative axial movement will increase the length of one of the said axial air gaps and decrease that of the other.

6. In a thrust dynamometer for power transmission mechanism, the combination with two transmission elements of the transmission mechanism of resilient connecting means connected between them so that the thrust to be measured is transmitted through said means and an electromagnetic measuring device connected to said elements to measure the relative axial movement between them and including a group of at least three magnetic circuits symmetrically arranged about an axis parallel to the line of the thrust to be measured and each having parts connected respectively to the transmission elements so as to be relatively moved to vary the reluctances of the circuits in accordance with the axial movement to be measured, a pair of stationary members relatively movable about an axis, a manually operable device for producing such relative angular movement, means for measuring the latter, a second group of corresponding magnetic circuits having parts so carried by the stationary members that relative angular movement between the latter will produce changes of reluctance thereof corresponding to those produced in the first group by relative axial movement of the transmission elements, and means for detecting lack of balance between the reluctances of the two groups of magnetic circuits.

7. In a thrust dynamometer for power transmission mechanism, the combination with two transmission elements of the transmission mechanism, of two resilient members which are connected between the transmission members so that the trust to be measured is transmitted through them in series and of which one comprises inner and outer coaxial annuli and a plurality of resilient spokes formed integral with both said annuli to avoid backlash and shaped so as to be comparatively flexible as regards relative axial movement between the annuli and comparatively stiff as regards relative angular movement about the axis, means for measuring the relative axial movement between the annuli, and damping means connected across the other resilient member.

8. In a thrust dynamometer for power transmission mechanism, the combination with two transmission elements of the transmission mechanism, of two resilient members which are connected between the transmission members so that the thrust to be measured is transmitted through them in series and of which one comprises inner and outer coaxial annuli and a plurality of resilient spokes formed integral with both said annuli to avoid backlash tapering from both ends towards an intermediate point and shaped so as to be comparatively flexible as regards relative axial movement between the annuli and comparatively stiff as regards relative angular movement about the axis, means for measuring the relative axial movement between the annuli, and damping means connected across the other resilient member.

NEIL SHAW MUIR.